E. HARDS.
WINDMILL.
APPLICATION FILED AUG. 21, 1908.

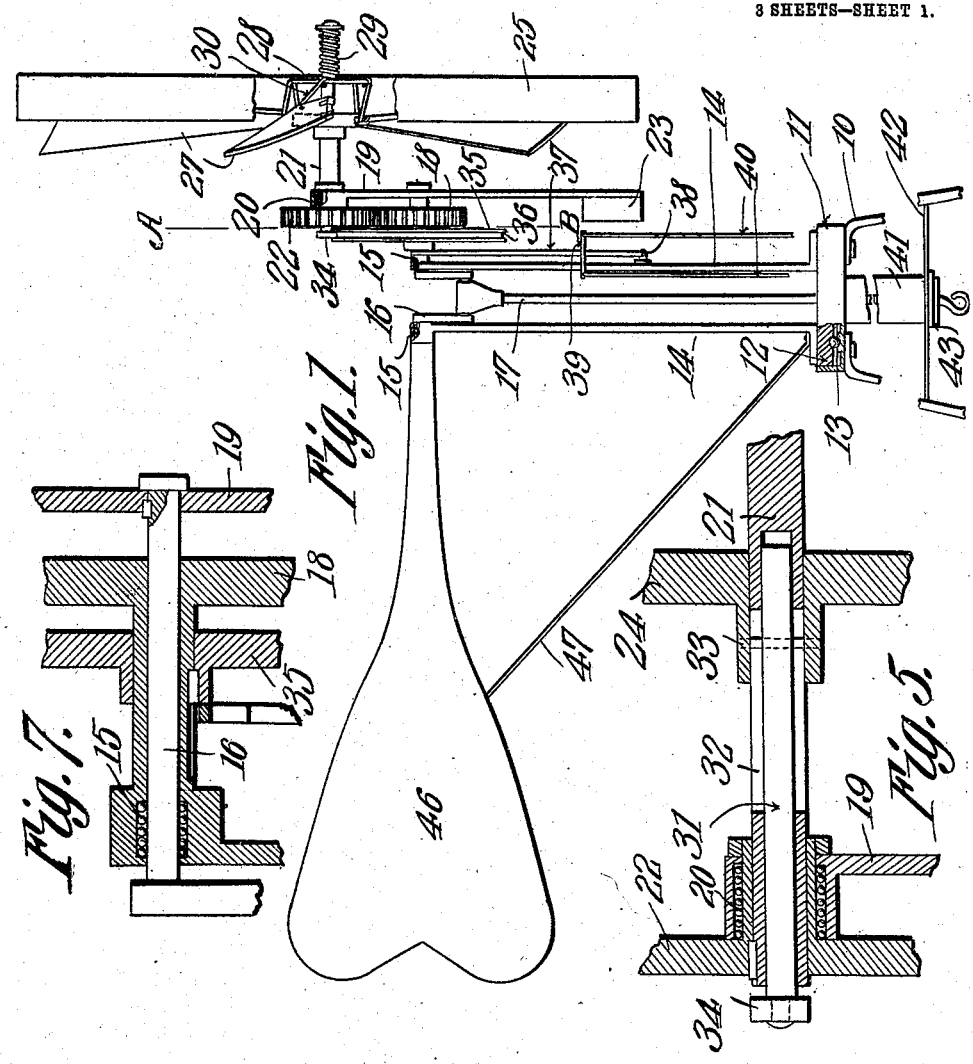

924,060.

Patented June 8, 1909.
3 SHEETS—SHEET 2.

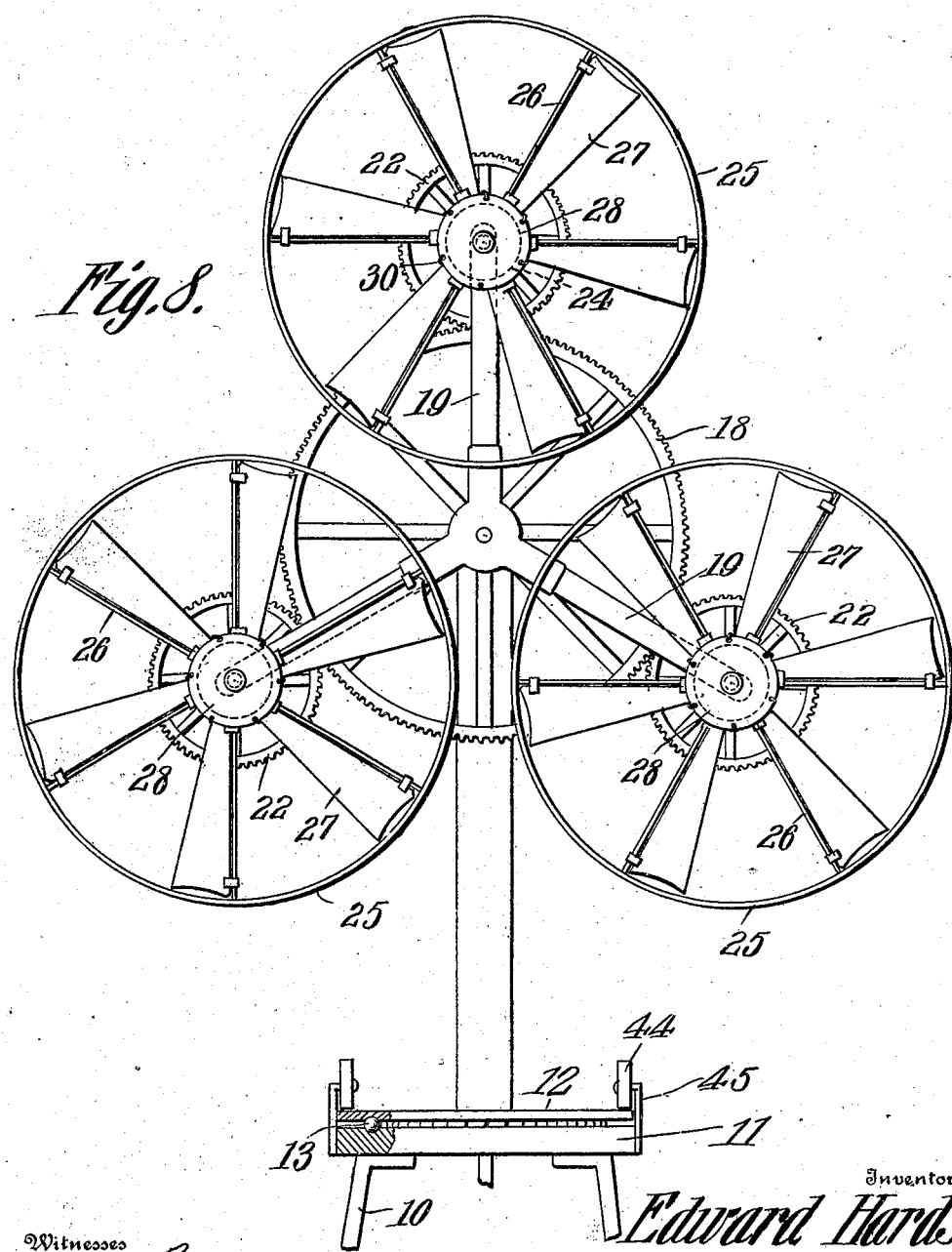

UNITED STATES PATENT OFFICE.

EDWARD HARDS, OF PHOENIX, ARIZONA TERRITORY, ASSIGNOR OF ONE-THIRD TO LUTHER D. COGGINS, OF PHOENIX, ARIZONA TERRITORY.

WINDMILL.

No. 924,060.             Specification of Letters Patent.          Patented June 8, 1909.

Application filed August 21, 1908. Serial No. 449,701.

*To all whom it may concern:*

Be it known that I, EDWARD HARDS, a citizen of the United States, residing at Phoenix, in the county of Maricopa and Territory of Arizona, have invented a new and useful Windmill, of which the following is a specification.

This invention relates to wind mills and the principal object is to improve the general construction of such a mill.

Another object of the invention is to provide a wind mill with an improved form of gearing whereby the lifting power of the mill is increased.

A further object of the invention is to provide, in a wind mill of the character described, an improved means to cause the wind wheel to run steadily in varying conditions of wind and obviate the effect of sudden gusts.

With the above and other objects in view the invention consists in general of a wind mill equipped with a crank shaft, a second shaft carried on an arm attached to the crank shaft supporting a wind wheel which is attached to the said second shaft in an improved manner, and gears connecting the crank shaft and the wind wheel shaft.

The invention further consists in certain novel forms of construction, combination of details, and arrangement of parts hereinafter fully described, illustrated in the accompanying drawings, and specifically set forth in the claims.

In the accompanying drawings, like characters of reference indicate like parts in the several views, and; Figure 1 is a side elevation of a wind mill constructed in accordance with this invention, certain portions being broken away to show the bearings. Fig. 2 is an enlarged view in section on the line A B of Fig. 1. Fig. 3 is a vertical sectional view taken through the center of the wind wheel and shaft to show the wind wheel's parts in a flattened position. Fig. 4 is a view similar to Fig. 3 showing the blades and blade controlling parts in the position assumed when the blades are feathered. Fig. 5 is a sectional view taken through the wind wheel shaft to show the method of controlling the wind wheel blades. Fig. 6 is a sectional view through the crank shaft to show the controlling lever for moving the blades into and out of the feathered position. Fig. 7 is a detail section showing the mounting of the fixed gear on the crank shaft bearing. Fig. 8 is a view showing a modification of the invention in which a plurality of wind wheels are used, said wheels arranged to balance each other.

The numeral 10 indicates the frame work at the top of the wind mill tower and upon this frame work is mounted the bottom plate 11 of a ball foot step bearing. At 12 is shown the top plate of this bearing and the plates 11 and 12 have balls 13 interposed between them for the purpose of lessening the friction as the wind mill revolves around the vertical axis. Next to the top plate 12 is a pair of standards 14 having ball bearings 15 at the upper end, in which is mounted a crank shaft 16 to which is connected the pitman 17 which extends downward to connect with a pump piston rod or the like. The front bearing 15 extends well toward the front of the wind mill and a gear 18 is rigidly connected thereto. The crank shaft 16 projects through this bearing and an arm 19 is fixed on the end thereof. Upon this arm there is a roller-bearing 20, wherein is held a wind-wheel shaft 21. A gear 22 is rigidly attached to the wind-wheel shaft 21 and meshes with the gear 18. In the form shown in Fig. 1 the arm 19 is continued beyond the bearing, and is provided at its end with a counterbalance 23. In the form shown in Fig. 8, however, there is a plurality of the arms 19, and in place of the counterbalance 23, these arms are connected together at the center and mutually act as counterbalances. In this latter form there is also a plurality of the other parts supported on the arm 19.

Slidable on and rotatable with the wind-wheel shaft 21 is a wind-wheel whereof 24 indicates the hub and 25 the rim. Between the hub 24 and the rim 25 is a plurality of spokes 26, on each of which is mounted a blade 27, of suitable form and shape. Each blade is so mounted as to be freely rotatable on its spoke.

At 28 is indicated a plate or spider which is free to slide and rotate on the shaft 21, but which is resiliently connected thereto by means of a coiled spring 29, one end of which is rigidly attached to the plate, while the other end is similarly attached to the shaft 21. Rods 30 are connected at their inner ends to the plate 28, while their other ends are connected to the free inner corners of the blades 27. From an inspection of Figs. 3 and 4 it will be apparent that by varying the distance between the hub 24 and the plate 28 the blades 27 may be caused to assume a different pitch angle varying from a position parallel to the plane of rotation to positions perpendicular thereto.

For the purpose of varying the position of hub 24 along the shaft 21 the said shaft is made hollow and a plunger 31 is held therein. Slots 32, preferably oppositely disposed are provided between the hollow interior of the shaft and the exterior and a pin 33 passes through the plunger 31 and extends outward through the slot 32 and into the hub 24. The rear end of the plunger 31 extends behind the gear 22 and is provided with a roller 34. Upon the front bearing 15 is slidably mounted a species of cam plate indicated at 35. This plate has a peripheral groove 36 provided therearound and the roller 34 is arranged to run in this groove. A lever 37 is pivotally connected to this cam plate and is mounted on one of the standards 14 as indicated at 38. This lever is provided with a cross arm 39 and wires 40 extend downward from the cross arm to the foot of the wind mill tower. Assuming that the parts are in the position shown in Fig. 1 it will be plain that by pulling on the left hand wire 40 of that figure the lever 37 will have its upper end forced toward the left. This will carry with it the plate 35 which will draw the plunger 31 out of the hollow shaft 21 to a certain extent. This will cause the hub 24 to move toward the left thereby causing the blades 27 assuming the position shown in Fig. 3. If the opposite wires be pulled the parts will be moved toward the right of Fig. 1 and the blades will assume the position shown in Fig. 4. In the event of a sudden gust of wind arising the spring 29 will yield and permit the plate 28 to slide toward the hub 24. The blades will, under those conditions, feather as in Fig. 4 precisely as if the hub 24 had been moved toward the plate. As soon as the wind gust has passed the parts will again assume the position in which they were before the yielding of the spring 29. It is thus possible to closely regulate the speed of the wheel by properly positioning the wires 40.

In the form of the foot step bearing shown in Fig. 1 the top plate 12 is provided with a tubular extension 41 which passes downward through the bottom plate 11 and is connected to the top of the wind mill tower by means of a spider 42, being freely revoluble therein. A washer 43 is provided on the lower end of the tubular extension to hold the top plate 12 in proper position on the lower plate 11. In the form shown in Fig. 8 the upper and lower plates are held together by means of rollers 44 supported by suitable brackets 45 secured to the lower plate, the rollers bearing against the upper surface of the upper plate.

For the purpose of keeping the wind wheel constantly facing toward the direction from which the wind blows there is provided a vane 46 rigidly attached to one of the standards 14 and braced at the bottom by means of a suitable rod 47.

In the operation of the device, assuming the blades to be properly positioned, the wind will cause the wind wheel to revolve thus rotating the gear 22 and the rotation of gear 22 causes the wind wheel and arm 19 whereon it is mounted to rotate around the axis of the crank shaft 16. By means of the peculiar arrangement of the gearing this causes the wind wheel to revolve twice to the single revolution of the crank shaft 16. This is the case when the gears are proportioned as shown in Fig. 1, both the gears being of equal diameter. When the gears are proportioned as shown in Fig. 8 the stationary gear being substantially twice the diameter of the moving gears, the wind wheels will revolve substantially four times to the single revolution of the crank shaft. There is thus a great gain in power by the use of this peculiar form of gearing. It is obvious that, by changing the proportioning of these gears, greater or less power may be obtained as may be desired.

It will be noticed that with this form of wind mill a relatively small wind wheel may be used to accomplish the same result that a much larger wheel is required to accomplish when coupled directly to the crank shaft. This wheel is especially desirable in locations where violent and irregular winds are prevalent. It will also be observed that in the event of a certain gust of wind causing the wind wheel to revolve rapidly, the resiliency of the spring will allow the wind wheel to rotate around its shaft to a certain extent and that, when the gust has passed, the shaft will be rotated by the force of the spring. The wind wheel will thus be caused to move smoothly around the fixed gear and the device will operate without jerking or jumping.

It is obvious, that other minor changes may be made in the form and construction of this device. It is not therefore desired to confine the invention to the exact form herein shown and described, but it is wished to include all such as properly come within the scope thereof.

It has been found, by actual test, that a mill such as herein described, and utilizing a six-foot wind-wheel, has four times the power of other constructions utilizing wheels of the same size.

Having thus described the invention, what is claimed as new, is:—

1. In a wind mill, a crank shaft bearing, a crank shaft, an arm rigidly attached to the crank shaft provided with a bearing at the end thereof, a wind wheel shaft held in the arm bearing, a wind wheel mounted on said wind wheel shaft, means connecting the wind-wheel and shaft, a fixed gear concentric with the crank shaft, and a gear mounted on said wind-wheel shaft for rotation therewith and meshing with the fixed gear.

2. In a wind mill, a crank shaft bearing, a crank shaft, an arm rigidly attached to said crank shaft provided with a bearing at the end thereof, a wind wheel shaft held in the arm bearing, a wind wheel mounted on said second shaft, a resilient connection between said second shaft and wind wheel, a fixed gear concentric with the crank shaft, and a gear mounted on said wind wheel shaft for rotation therewith and meshing with the fixed gear.

3. In a wind mill, a crank shaft bearing, a crank shaft, an arm rigidly attached to said crank shaft provided with a bearing at the end thereof, a wind-wheel shaft held in the arm bearing, a wind wheel mounted on said wind wheel shaft, a spiral spring surrounding said second shaft and having its ends connected to said shaft and said wind wheel respectively, a fixed gear concentric with the crank shaft, and a gear mounted on said wind wheel shaft for rotation therewith and meshing with the fixed gear.

4. In a wind mill, a crank shaft bearing, a crank shaft, an arm rigidly attached to said crank shaft provided with a bearing at the end thereof, a wind wheel shaft held in the arm bearing, a wind wheel mounted on said wind wheel shaft means connecting the wind-wheel and its shaft, a fixed gear concentric with the crank shaft, a gear mounted on said wind wheel shaft for rotation therewith and meshing with the fixed gear, feathering blades mounted on said wind wheel, and means to feather the blades.

5. In a wind mill, a crank shaft bearing, a crank shaft, an arm rigidly attached to said crank shaft provided with a bearing at the end thereof, a wind wheel shaft held in the arm bearing, a wind wheel mounted on said wind wheel shaft means connecting the wind-wheel and its shaft, a balance for said bearings and wheel on the opposite end of said arm, a fixed gear concentric with the crank shaft, a gear mounted on said wind wheel shaft for rotation therewith and meshing with said fixed gear.

6. In a wind mill, a crank shaft bearing, a crank shaft, an arm rigidly attached to said crank shaft provided with a bearing at the end thereof, a wind wheel shaft in the arm bearing, a wind wheel having feathering blades, mounted on said wind wheel shaft, a resilient connection between said wind wheel and wind wheel shaft, a fixed gear concentric with the crank shaft, a gear mounted on said wind wheel shaft for rotation therewith and meshing with the fixed gear, and means to feather said wind wheel blades.

7. In a wind mill, a crank shaft bearing, a crank shaft, an arm rigidly attached to said crank shaft provided with a bearing at the end thereof, a wind wheel shaft held in the arm bearing, a wind wheel mounted on said wind wheel shaft and provided with feathering blades, a balance for said bearing and wheel on the opposite end of said arm, a spiral spring surrounding said second shaft and having its ends connected to said shaft and wind wheel respectively, a fixed gear concentric with the crank shaft, and a gear mounted on said wind wheel shaft for rotation therewith and meshing with the fixed gear, and means to feather the wind wheel blades.

In testimony that I claim the foregoing as my own, I have hereto affixed my signature in the presence of two witnesses.

EDWARD HARDS.

Witnesses:
J. LEWIS SCOTT,
MARY BOYLE.